July 3, 1923.

S. S. AMDURSKY 1,461,010

AUTOMATIC VALVE

Filed May 29, 1920

INVENTOR
Samuel S. Amdursky
BY
Fridrich F. Church
his ATTORNEY

July 3, 1923. 1,461,010

S. S. AMDURSKY

AUTOMATIC VALVE

Filed May 29, 1920    2 Sheets-Sheet 2

INVENTOR
Samuel S. Amdursky
BY Frederick F. Church
his ATTORNEY

Patented July 3, 1923.

1,461,010

UNITED STATES PATENT OFFICE.

SAMUEL S. AMDURSKY, OF ROCHESTER, NEW YORK, ASSIGNOR TO TAYLOR INSTRUMENT COMPANIES, OF ROCHESTER, NEW YORK, A CORPORATION OF NEW YORK.

AUTOMATIC VALVE.

Application filed May 29, 1920. Serial No. 385,327.

*To all whom it may concern:*

Be it known that I, SAMUEL S. AMDURSKY, a citizen of the United States, residing at Rochester, in the county of Monroe and State of New York, have invented certain new and useful Improvements in Automatic Valves; and I do hereby declare the following to be a full, clear, and exact description of the same, reference being had to the accompanying drawings, forming a part of the specification, and to the reference numerals marked thereon.

This invention relates to valves which are automatically moved in a given direction on the occurrence of a predetermined condition in the supply line in which these valves are placed. One object is to provide an improved means for moving a valve in a given direction on the attainment of a predetermined pressure.

A further object resides in the simplification of construction and the general compactness of the automatic means for operating a valve. To these and other ends, the invention consists in certain improvements and combinations of parts, all as will be hereinafter more fully described, the novel features being pointed out in the claims at the end of the specification.

In the drawings.

Similar reference characters throughout the several views indicate the same parts.

The principal features of my invention comprise the general simplicity and arrangement of parts and the improved automatic operating means for a valve in a fluid pressure line on the attainment of a predetermined condition in the line or in some other fluid container connected to the automatic operating means.

Figure 1:
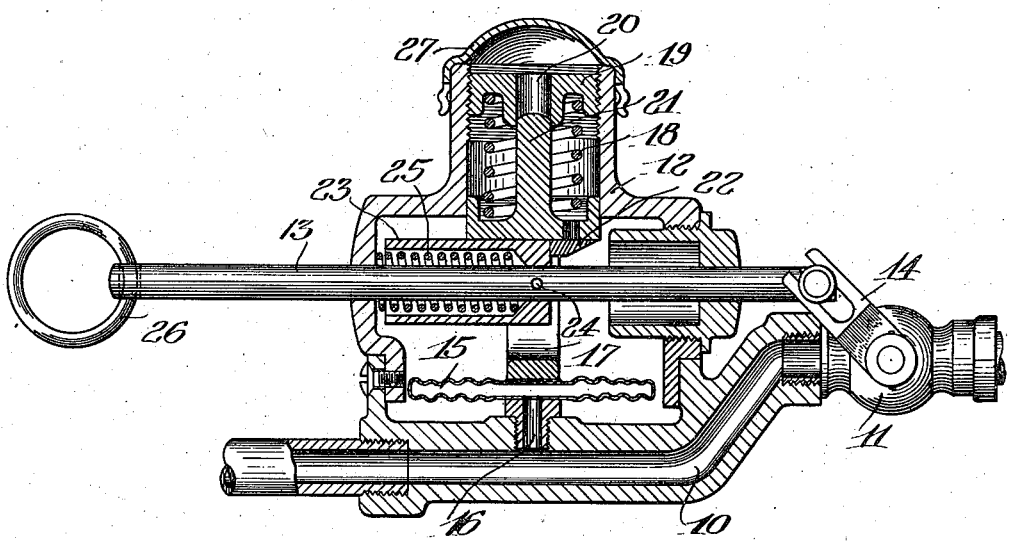
Figure 1 represents a cross sectional view of a fluid pressure line and the automatic valve operating means with the valve in closed position.
Figure 2:
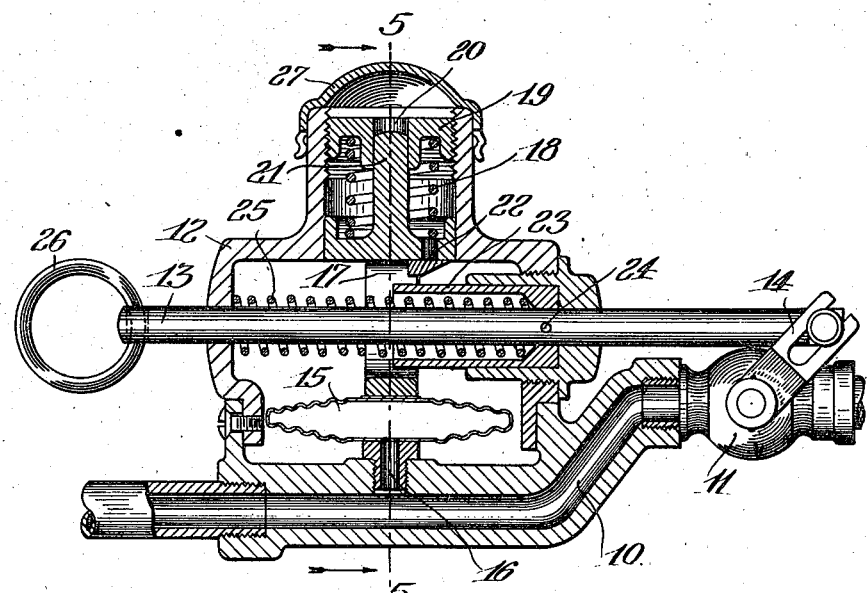
Figure 2 is the same as Figure 1 except that the valve is open.
Figure 3:
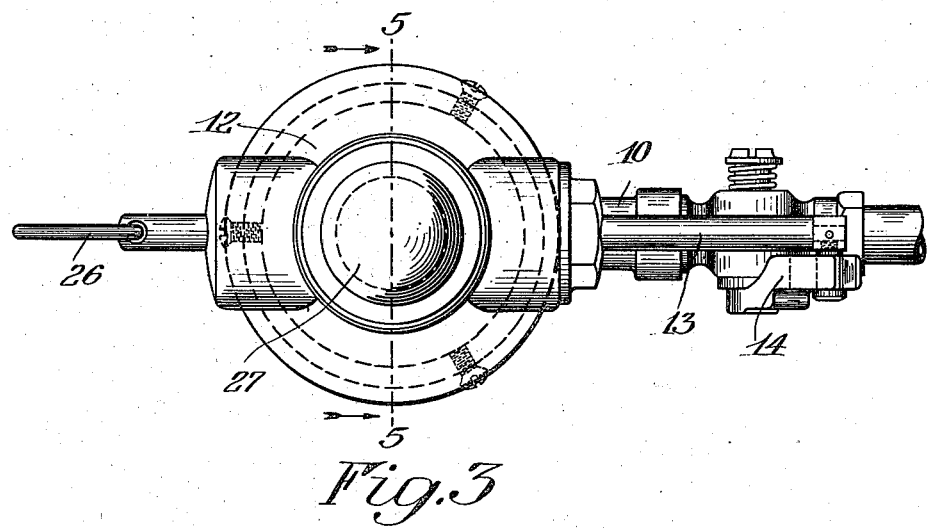
Figure 3 is a top plan view of the valve and automatic means therefor.
Figure 4:
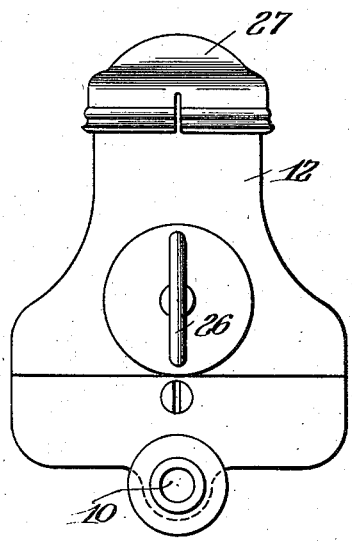
Figure 4 is a left hand end view of the device shown in the foregoing figures.
Figure 5:
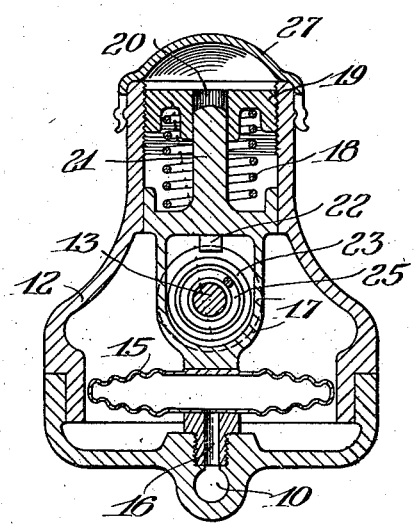
Figure 5 is a section on the line 5—5 of Figures 2 and 3.

Referring to the drawings, a fluid pressure line 10 is provided with a valve 11 therein, adapted to be controlled by the pressure responsive means 15 contained in the housing 12 which is preferably of bronze or other suitable material, which means acts upon the valve bar 13 through suitable connections on the attainment of a predetermined pressure to move the same to the right, as shown in Figure 2, and operate the valve by means of the lever 14 attached thereto. An expansible chamber or diaphragm 15, preferably corrugated and of metal, as indicated in the drawing so as to be readily expansible, may be in communication through the passageway 16 with the fluid pressure main 10 when the diaphragm is to be responsive to pressure in the main or when responsive to pressure elsewhere the passageway may lead thereto. Resting against the diaphragm 15 and adapted to be slidably moved thereby against the action of the spring 18 is the yoke member 17, shown more clearly in Figure 5 which is of sufficient size to embrace the bar 13 and sleeve 23. The spring 18 cooperates with the top of the yoke member 17 and with the adjustable nut 19 located as shown in the top of the housing 12 and provided with a central aperture 20 therein to afford a guideway for the slidable stem 21 of the yoke member. A stop member 22, preferably of steel or other appropriate material, is rigidly secured on the yoke member, as indicated, and is adapted to engage a sleeve 23 on the bar 13 when the latter is in the position indicated in Figure 1 where it is shown as retracted against the force of the spring 25, which cooperates with the casing or housing 12, and with the sleeve 23 which serves to guide the spring when in compressed position. The sleeve is secured to the bar 13 by the pin 24, and is also adapted to be engaged by the stop 22, as shown in Figure 1. A ring or other appropriate handle may be placed on the left end of the bar 13 for convenience in moving the same to the left or retracted position. The housing 12 may be provided with a cap piece 27 sprung over the top thereof to protect the adjustable nut 19.

In operation the bar 13 is manually retracted against the action of the spring 25 from the position shown in Figure 2 to that shown in Figure 1 until there is sufficient pressure in the main 10 to cause the diaphragm 15 to expand and slide the yoke 17 and stop member 22 far enough against the action of the spring 18 to enable the sleeve 23 and bar 13 to become disengaged from the stop member 22 when the spring 25 then moves the bar 13 to the right and operates the valve as shown in Figure 2. The pressure at which the diaphragm acts to operate the valve is readily and accurately controlled by the adjustment of nut 19.

One use to which the automatic valve is particularly adapted is in conjunction with fluid supply lines controlled by regulating devices responsive to pressure for various processes. Some regulating devices of this character do not function to best advantage at partial pressures while full pressure is being built up in the supply main at the start of operations. In such cases, the present valve may be inserted in the supply main ahead of the regulating device and closed and set to open at full pressure. The main is thus kept closed until full pressure is built up, when the valve opens automatically and transmits such pressure. But the invention is of course capable of many other uses.

The controlling mechanism and diaphragm are fully enclosed and protected from dirt and injury and may be conveniently set to operate at any predetermined pressure, while the parts are rugged in construction, compactly arranged and positive in their operation.

I claim as my invention:

1. The combination with a source of fluid pressure, of an automatic valve comprising an expansible fluid pressure chamber in communication with said source of pressure, operating means normally tending to open said valve, and a stop member actuated by the expansible chamber cooperating with said means to hold the same in a position closing said valve and adapted to be moved to a position releasing said means when said expansible chamber has been enlarged a given amount under the influence of a predetermined pressure.

2. The combination with a source of fluid pressure of an automatically opened valve comprising an expansible chamber responsive to pressure of said source, a valve operating bar slidable transversely to the direction of expansion of the chamber and provided with spring means normally tending to move said valve to open position, and a stop member operatively connected with said expansible chamber holding said bar and valve in the closed position of the valve, and adapted to be moved by said expansible chamber to release said bar, and valve for movement to the open position of the valve.

3. In an automatically operated valve, the combination with a source of fluid pressure, of a valve, an expansible chamber in communication with said source of pressure and responsive to an increase in pressure therein, a yoke and stop member adjustably connected to and movable by the expansive operation of said chamber, and operating means slidable within said yoke and normally tending to move said valve to open position, said means being engaged by said stop member and held with said valve in closed position, but adapted to be released by the expansion of said chamber and sliding of the stop member, for moving the valve to open position.

4. In an automatically operated valve, the combination with a source of fluid pressure, of a valve, a resilient expansible chamber responsive to said fluid pressure, a stop member arranged to hold said valve in closed position and slidably operated by the expansible chamber, a housing for the expansible chamber and stop member, a slidable bar engaged by said stop member and attached to said valve, and a spring in said housing in cooperation with said bar and housing and normally tending to move said bar and valve to open the latter when said bar is released by said stop member.

5. The combination with a source of fluid pressure of an automatic valve for controlling the same responsive to a predetermined degree of said fluid pressure, and comprising a diaphragm chamber in communication with and responsive to said fluid pressure, a stop member actuated by the diaphragm, and a valve operating means normally tending to move said valve to open position and engaged by said stop member to hold the valve in closed position, said valve operating means being released by said stop member to open the valve on the expansion of the diaphragm a given amount under the influence of a predetermined pressure.

6. The combination of a fluid pressure line, a valve for opening said line upon the attainment of a predetermined degree of said pressure, a housing adjacent said valve and having therein actuating means for the valve comprising an expansible diaphragm responsive to said fluid pressure, a stop member slidably actuated by said diaphragm, a slidable valve operating bar and bearings therefor within said housing, and resilient means cooperating with said bar and housing within the latter normally tending to move said bar to open said valve, said stop member engaging said bar and holding the same in position for closing the valve, said bar being released by said stop member to open the valve on the attainment of a predetermined pressure within said diaphragm.

7. The combination with a source of fluid pressure of a valve therefor, a housing adjacent said valve and having therein actuating means automatically operating said valve, comprising a diaphragm expansible by said fluid pressure, a slidable yoke member moved by expansion of the diaphragm, an adjustable resilient member cooperating with said housing and yoke member to force the latter into contact with the diaphragm, a bar slidable through the housing and attached to the valve to operate the same, a second resilient member cooperating with the housing and bar normally tending to open said valve, and a stop member on said yoke engaging said bar to hold the same in retracted position with the valve closed, said bar being adapted to be released by the stop member on the expansion of the diaphragm a predetermined amount by said fluid pressure, the diaphragm, yoke, stop and both resilient members all being contained within the housing.

8. The combination with a fluid pressure line and a valve therein, of automatic mechanism responsive to pressure in the line to move said valve to open position, comprising a longitudinally slidable bar connected with said valve, a stop member retaining said bar in the closed position of the valve, a pressure responsive means attached to said stop member and adapted to disengage the same from said bar upon a predetermined increase of pressure within said source, and a resilient member cooperating with said bar for moving the same to open the valve when disengaged by said stop member.

SAMUEL S. AMDURSKY.